United States Patent [19]

O'Gwynn

[11] Patent Number: 4,514,672
[45] Date of Patent: Apr. 30, 1985

[54] ADAPTIVE APPARATUS AND METHOD FOR CONTROL

[75] Inventor: David C. O'Gwynn, San Mateo, Calif.

[73] Assignee: Ampex Corporation, Redwood City, Calif.

[21] Appl. No.: 483,004

[22] Filed: Apr. 6, 1983

[51] Int. Cl.³ .............................................. G05B 5/01
[52] U.S. Cl. .................................. 318/616; 318/618; 318/615
[58] Field of Search ................. 318/616, 7, 615, 618, 318/702; 360/90, 73

[56] References Cited

U.S. PATENT DOCUMENTS 4,143,311  3/1979  Lee ........................................ 318/611
4,156,257  5/1979  Roberts ................................. 360/71

Primary Examiner—J. V. Truhe
Assistant Examiner—Saul M. Bergmann
Attorney, Agent, or Firm—George B. Almeida; Joel D. Talcott

[57] ABSTRACT

An improved control apparatus and method for servo system control is disclosed wherein a generally increasing or decreasing control signal is supplied to a source of energy when a desired parameter of interest produced by said source of energy is not equal to a desired value, and a constant control signal when the parameter of interest does equal the desired value. The constant control signal is determined by the previous constant control signal plus the product of the difference between the peak value of the generally increasing or decreasing control signal and the previous constant control signal multiplied by a constant.

14 Claims, 6 Drawing Figures

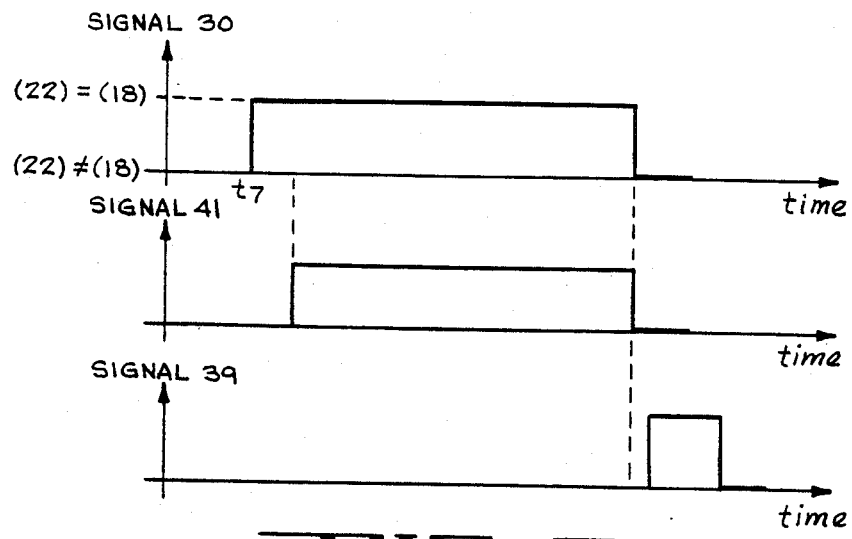
FIG_2
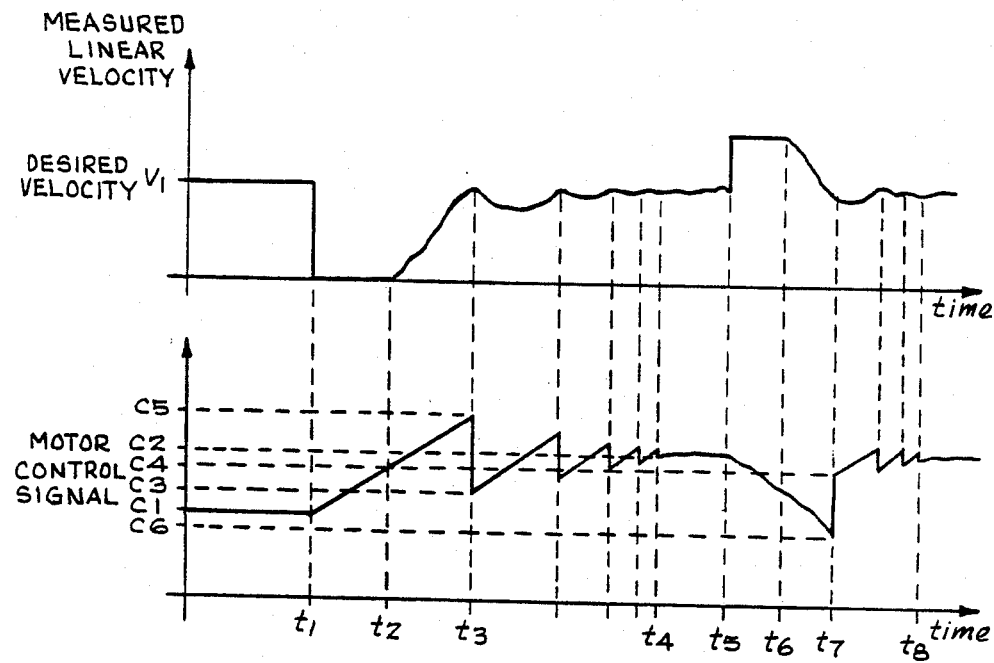
FIG_3

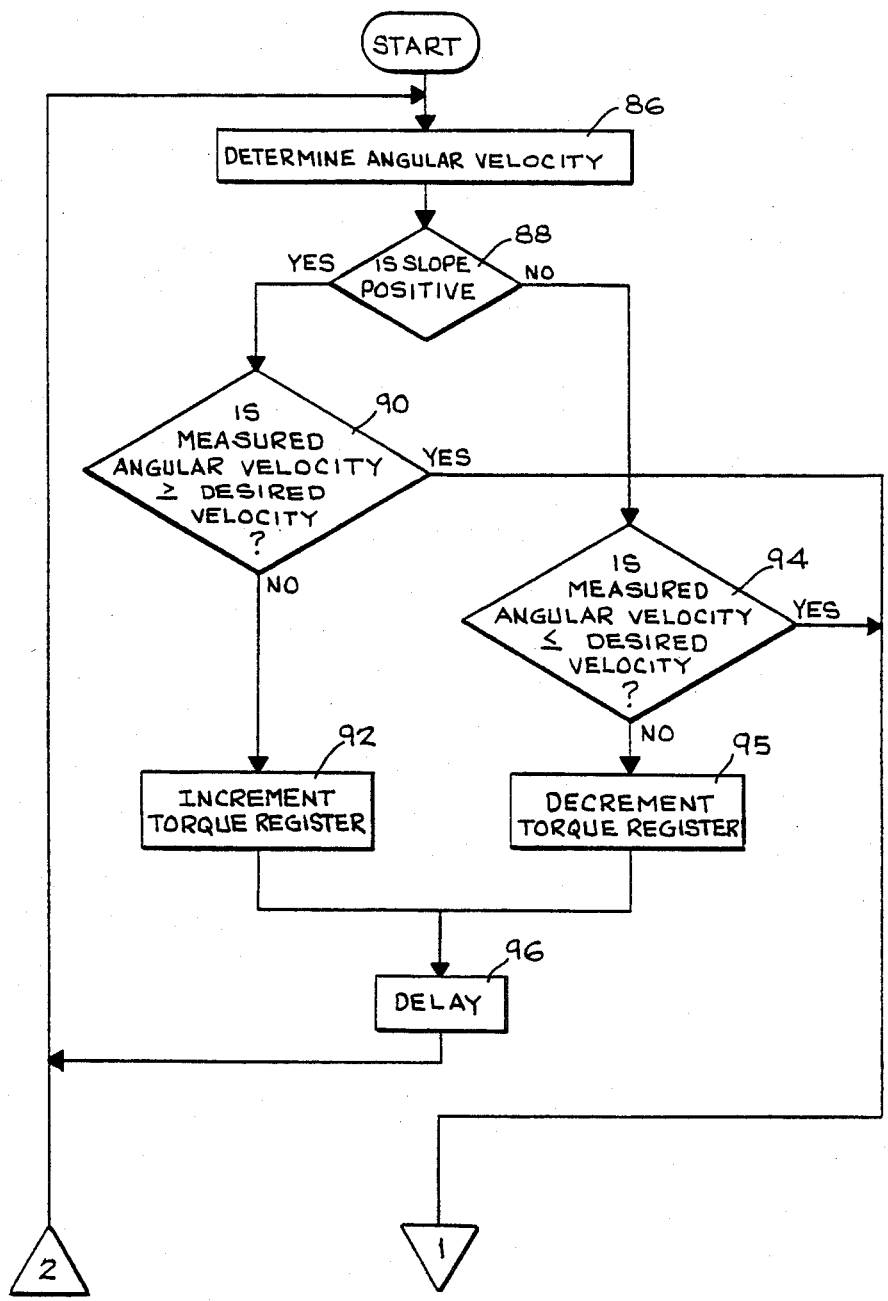
FIG_5

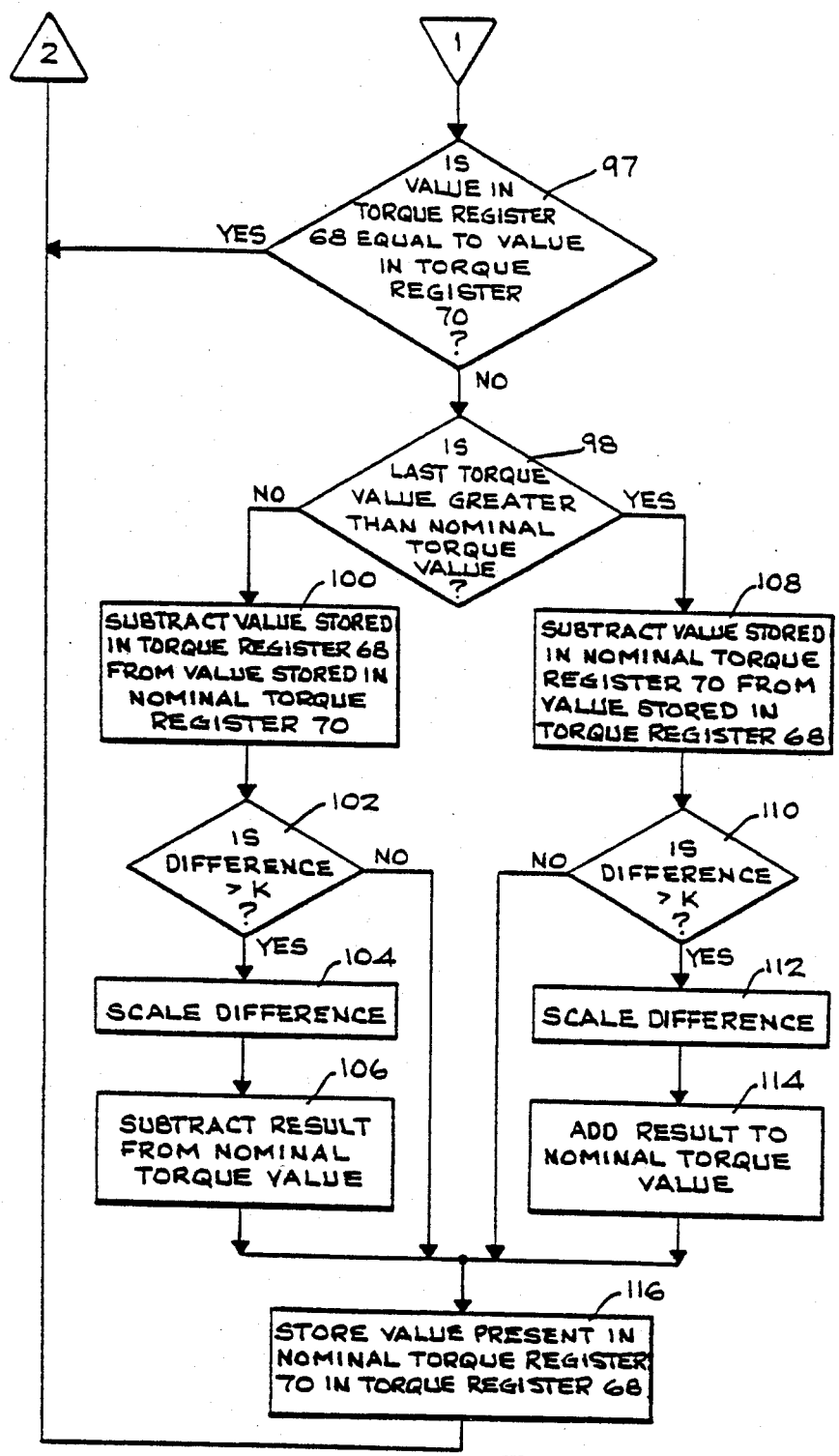
FIG_5

ADAPTIVE APPARATUS AND METHOD FOR CONTROL

This invention relates to servo control systems, and particularly to systems wherein inertia inherent in the operation of the system is a detrimental response limiting factor.

In dealing with servo systems there is, broadly speaking, a motive force element which prodcues a parameter of interest. Generally, it is desirable to maintain the parameter of interest at a defined value. It should be observed that the relationship between the parameter of interest and the source of energy may vary considerably. A few examples will be illustrative of the conceptual principles involved.

In dealing with the angular velocity of a disk attached to the shaft of an electric motor, the electric motor represents the source of energy which produces angular velocity of the disk as the parameter of interest, wherein it is desirable to maintain a defined angular velocity. In another example relating to an environmental control system wherein temperature in an environmental chamber is desired to be controlled, the source of heat or cooling would represent the source of energy wherein the temperature within the environmental chamber would be the parameter of interest, with the defined value being a particular temperature. In another example relating to an automatic speed control system for a conventional automobile, the automobile engine would represent the source of energy which produces velocity of the automobile as the parameter of interest, having a particular velocity at which it was desired to maintain the speed of the automobile as the defined value. In another example relating to a vacuum system, the source of the vacuum, e.g., a vacuum pump, would represent the source of energy which produces vacuum as the parameter of interest, having a particular level of atmospheric pressure as the defined value. In yet another example relating to an electrical switching power supply, the pulse width of the switching control waveform would represent the source of energy producing an output voltage as the parameter of interest having a particular output voltage level as the defined value.

Generally speaking, the degree to which the parameter of interest may be accurately controlled, e.g., maintained at a particular value, is determined not only by the characteristics of the source of energy, but also by other factors related to the parameter of interest and the environment in which the quantity of interest exists. In the disk attached to the electric motor example, clearly the degree to which the angular velocity may be controlled is determined not only by the amount of torque the source of energy is capable of producing, but also by the mass of the disk, as well as the rotational resistance presented by the environment in which the disk rotates. In the environmental control system example, the degree to which the constant value of the temperature may be controlled is determined not only by the capabilities of the source of energy (e.g., the source of heating or cooling), but also by the physical size of the environmental chamber as well as the rate of transfer of energy between the environmental chamber and its external environment. In the automatic automotive speed control example, the degree to which the velocity may be controlled is determined not only by the amount of torque the source of energy (e.g., the automotive engine) is capable of producing, but also by the characteristics of the corresponding automotive transmission system as well as numerous other factors relating to the environment, e.g., level of the road, wind velocity and direction, etc. In the example relating to the electrical switching power supply, the degree to which the output voltage may be accurately controlled is determined not only by the source of energy, e.g., the amount of current capable of being supplied to the storage element by the switching element, but also by the electrical capacitance of the electrical storge element, as well as the electrical load presented by the electrical environment connected to the output of the switching power supply.

It is generally desirable that the parameter of interest produced by the source of energy be equal to a desired value. As the parameter of interest produced by the source of energy is generally responsive to a control signal to the source of energy, the parameter of interest is therefore susceptible of control by controlling the control signal to the source of energy. In such a control arrangement, the parameter of interest is generally measured and compared against a desired value. Thereafter the control signal to the source of energy is dynamically adjusted to effect agreement between the parameter of interest and the desired value.

However, as previously discussed the degree to which the parameter of interest may be accurately controlled is frequently limited by a number of factors, the net result of which are performance limitations.

One such performance limitation involves the amount of time required to respond to a change in either the desired value of the parameter of interest produced by the source of energy. Again, an example will serve to illustrate the concept involved herein. In considering the example involving the temperature control system previously discussed, if the environmental chamber were subjected to a relatively large change in temperature, a finite amount of time would be required for the source of energy, i.e., the source of heating or cooling, to readjust the parameter of interest, i.e., the temperature within the environmental chamber, to the desired value. In a similar fashion, if the pressure within the controlled environment previously discussed were abruptly changed, a finite amount of time would be required for the source of energy, i.e., the vacuum pump, to readjust the quantity of interest, i.e., the vacuum within the controlled environment, to the desired value of atmospheric pressure. Similar situations would exist in connection with the other examples discussed. The amount of time required for the source of energy to effect the desired change will depend upon the characteristics of each particular system, and will hereinafter be referred to broadly as the inertia present in the system. Considered in this way, it is clear that the basic concept of response time, i.e., the amount of time required for a control system to respond to a change, is directly related to the inertia inherent in the particular system.

An additional performance limitation relates to the range of desired values over which the source of energy is capable of satisfactorily controlling the parameter of interest to effect agreement with a desired value. Once again an example will best serve to illustrate the concept involved herein. In connection with the automatic automotive speed control, the necessity of maintaining a desired value of one-tenth mile per hour over a rough and bumpy road, and likewise being required to maintain a desired value of fifty miles per hour over a smooth road would present, as a practical matter, a formidable design problem. Clearly wide ranges of desired values in the presence of considerably different performance environments places practical limitations on the performance achievable by control systems.

In control systems heretofore known, the nature of the control signal to the source of energy would generally assume one of two basic forms. In a first form, the control signal would assume one of two constant values, depending upon whether the measured parameter was greater or less than the desired value. If the measured parameter was less than the desired value, the control signal would assume a first constant value which would result in the source of energy being driven at a first constant level. If the measured parameter was greater than the desired value, the control signal would assume a second constant value which would result in the source of energy being driven at a second constant level. Such an approach to the generation of the control signal is frequently referred to as a "bang-bang" approach.

In a second form, the control signal to the source of energy would assume a value proportional to the error between the desired value and the measured parameter of interest produced by the source of interest, e.g., the magnitude of the control signal would be relatively large when the difference between the desired value and the measured parameter was relatively large, and relatively small when the difference between the desired value and the measured parameter was relatively small.

The foregoing principles and the limitations resulting therefrom will be more fully understood by way of the following example relating to the control of the linear velocity of magnetic tape of a video tape recorder. It is to be understood, however, that while the following example will clearly illustrate the conventional approaches taken to the resolution of the problems heretofore discussed in one particular application, and the shortcomings resulting therefrom, the basic problems are generic in nature, and exist in similar forms in yet many different applications.

A video tape recorder records video information on magnetic tape which is moved by a tape transport from a supply reel past a video record/reproduce head to a take up reel. The tape transport is basically controlled by negative torque applied to a supply reel, and a positive torque applied to take up reel. Precise speed control is maintained by passing the magnetic tape between a capstan, which rotates at a constant angular velocity, and a pinch roller. However, it is frequently desirable to vary the linear velocity at which the magnetic tape moves past the magnetic record/reproduce head in the forward as well as reverse directions. In such a mode, the linear velocity of the magnetic tape is not controlled by the capstan and pinch roller arrangement, but rather by the rotation of the supply and take up reels directly. It should be observed in this mode of operation that the effective diameter of the supply and take up reel continually changes as the magnetic tape is transferred from the supply reel to the take up reel. It is therefore observed that the angular velocities associated with the supply and take up reels produced by the source of energy, i.e., the reel motors, must continually change to result in the parameter of interest, i.e., a constant linear tape velocity, to be maintained at the desired constant level.

One particular problem which is especially troublesome in attempting to move the magnetic tape at very slow rates, e.g., rates which approach zero inches per second, results from the interaction between the magnetic tape with the guides over which it passes in moving from the supply reel to the take up reel. In particular, the magnetic tape will tend to "stick" and subsequently "slip" in its travel from the supply reel to the take up reel. Such a phenomenon presents serious problems to a motor control system attempting to maintain a constant tape velocity relative to the record/reproduce head. While various solutions are possible to overcome the problem of the dynamically changing friction between the magnetic tape and the associated tape guides, the simultaneous requirement of having the capability of satisfactorily moving the tape at widely varying speeds and in different directions presents a formidable problem.

It should be observed that the basic problem presented in the required control of the reel motors on a video tape recorder, i.e., the source of energy, to produce the parameter of interest, i.e., a desired constant linear tape velocity, is in the generation of the appropriate control signal to the source of energy. It should be further noted that the generic problem present herein, i.e., producing a control signal to the source of energy in such a fashion that the parameter of interest produced by the source of energy is adjusted to agree with a desired value, with a minimum response time while maintaining operational capabilities over a wide range of desired value, is identical to the one present in the previously discussed examples.

One approach to the problem of designing a constant velocity servo system in the video tape recorder problem employs the use of a position servo system. In such an approach a desired velocity is supplied as an input to a desired position generator which, based on a time reference, produces a control signal as one input to a summing network. The output from the summing network serves as an input to an amplifier having gain compensation, which thereafter produces a control signal for the electric motor. Coupled to the electric motor is a position transducer which generates a signal which in turn is subtracted from the output of the desired position generator by the summing means.

Use of a position servo system to achieve a constant velocity yields minimal velocity error. This result follows from the fact that the error signal in a position servo system represents positional error. As velocity is the first time derivative of position, fixed positional error does not affect the resulting velocity.

While the use of a position servo system to implement a constant velocity servo system does yield accurate velocity control, a number of drawbacks are present in such an approach. In particular, a position servo system requires a gain and compensation element. These elements are frequently complex and application dependent.

In addition to the foregoing, a position servo system necessarily requires a position transducer for the decoding of position. From a practical standpoint, this is also a complex and costly element.

Improved response time and relatively simple elements are present in a velocity servo system. A velocity servo system is generally composed of a summing element which, in response to a desired velocity input and a second input, produces an error signal. The error signal serves as an input to a gain element which drives the motor. Coupled to the motor is a velocity transducer which generates a signal representative of the measured velocity. The signal from the velocity transducer serves as the second input to the summing means. Consequently the output from the summing means represents the difference between the desired and measured velocities.

The employment of a velocity servo system to achieve constant velocity as above described is frequently less expensive to implement than a position servo system, due to the simplification of several elements. In particular, the gain element present in a velocity servo system requires less compensation, if any at all. This follows from the fact that as velocity is being controlled directly rather than indirectly by position as is present in a position servo system, there is consequently one less mathematical integration involved in the control process. This results in an improved bandwidth of a velocity servo system when compared with a position servo system. Furthermore, as the error signal present in a velocity servo system is based upon measured velocity, the necessary transducer is less complex, as the required decoding by the transducer is a change in the parameter of position, rather than the measurement of absolute position.

However, while a velocity servo system does achieve relatively constant velocity in a simpler manner than the corresponding position servo system, a number of disadvantages are nevertheless present. In particular, as the necessary servo error signal in a velocity servo system represents error between the desired and the measured velocity, rather than position as in the position servo system, the resulting velocity from such a system will necessarily be in error. This follows from the requirement of an error signal in the operation of a velocity servo system. This limitation is particularly significant when the desired constant velocity is relatively small. In such a situation, the resulting error signal is correspondingly small, and practical considerations result in relatively large errors in the resulting velocity. In particular, if the resulting error signal is less than that required to overcome friction inherent in the operation of the system, movement will not result. While this can be partially overcome through the use of increased gain, from a practical standpoint, such an approach introduces tradeoffs in the range of velocities attainable with such a system. In practice, dynamically varying loads which are frequently present when attempting to operate the motor at relatively slow constant velocities severely limit the accuracy of such a velocity servo system.

A degree of improvement in the achievement of constant velocity in a servo system is possible by the introduction of a second summing element between the motor and the gain element in a typical velocity servo system. In particular, the additional summing element serves to sum the error signal representative of the difference between the desired velocity and the measured velocity, and a signal representative of the desired velocity. Consequently the motor receives from the second summing network a control signal equal to the sum of the desired velocity and an error based on the difference between the desired and measured velocities. Such an approach provides for improved constant velocity characteristics. However, as the combination of the motor, velocity transducer and load define a transfer characteristic for the system, the introduction of the desired velocity signal to the second summing network necessarily requires a corresponding transfer function equal to the inverse of that transfer function defined by the motor, velocity transducer and load. The required presence of said inverse transfer function necessitates that gain and compensation be applied to the signal representative of the desired velocity prior to the second summing network. As the transfer function of the motor, velocity transducer and load combination and the corresponding inverse transfer function is dependent upon the load, changing loads on the motor result in said reciprocity between the transfer function being disturbed, with undesirable results on the velocity performance of the system. Variations in the load can result not only from the dynamics of a particular application, but also from environmental considerations, including changes in humidity and temperature. Such an approach is particularly sensitive to the problem previously described between magnetic tape and the associated tape guides at low velocities.

Consequently prior art approaches to the implementation of a constant velocity servo system require rather complex and expensive transducers. In addition, complex gain and compensation networks are also required, or tradeoffs resulting in less satisfactory velocity control, and performance dependence upon changes in the load. These shortcomings are particularly difficult to address using prior art techniques when it is necessary to maintain a constant velocity over a wide range of velocities, including relatively low velocities in the presence of dynamically changing loads.

SUMMARY OF THE INVENTION

The present invention is directed to overcoming the shortcomings and limitations present in the prior art in providing for performance over a wide operational range with substantially improved performance at extremes of operational limits. These goals have been achieved in a manner which is substantially simpler and more efficient in implementation than has heretofore been possible. In particular a control apparatus and method are disclosed for providing a control signal to a source of energy so that a parameter of interest produced by the source of energy is dynamically adjusted to maintain agreement with a desired value in a reduced amount of time. The control apparatus and method offer performance improvements in the presence of system inertia and dynamically varying loads. The instantaneous value of the parameter of interest is compared to a desired value. If the value of the parameter is less than the desired value, the control signal to the source of energy continually changes in such a manner to effect an increase in the parameter. If the value of the parameter is greater than the desired value, the control signal to the source of energy continually changes in such a manner to effect a decrease in the parameter. This process continues until the parameter equals the desired value, at which point the control signal to the source of energy changes to a constant value determined by the previous constant value of the control signal as well as the difference between the maximum or minimum value attained by the continually changing control signal and the previous constant value. In particular, the constat value to which the control signal changes is equal to the previous constant value of the control signal during the previous interval during which the parameter was equal to the desired value, plus the difference between said previous constant value and the peak value the continually changing control signal achieved just prior to the parameter becoming equal to the desired value, multiplied by a constant.

Consequently the control signal to the source of energy will be constant in value when the parameter of interest is equal to the desired value, and will exhibit a continuously increasing or decreasing value when the parameter is less than or greater than the desired value, respectively. As the magnitude of the constant control signal to the source of energy when the parameter equals the desired value is equal to the magnitude of the previous constant control signal plus an amount proportional to the difference between the peak maximum or minimum value of the changing level when the parameter does not equal the desired level and the previous constant control signal, the resulting control signal will exhibit a corresponding change in the base level in response to the non-equality between the parameter and the desired value.

It is observed that the approach set forth above is generic in nature, and consequently would have a broad range of application.

BRIEF DESCRIPTION OF DRAWINGS

FIG. 2 is a graph of time relationships of two signals produced by the apparatus of FIG. 2.

FIG. 3 is a graph of operational response characteristics of a motor controller in accordance with the present invention to changes in the measured velocity of apparatus driven by the motor.

FIGS. 5 sheet 1 and 5 sheet 2 are flow charts illustrating operation of the apparatus of FIG. 4.

DETAILED DESCRIPTION

Figure 1:
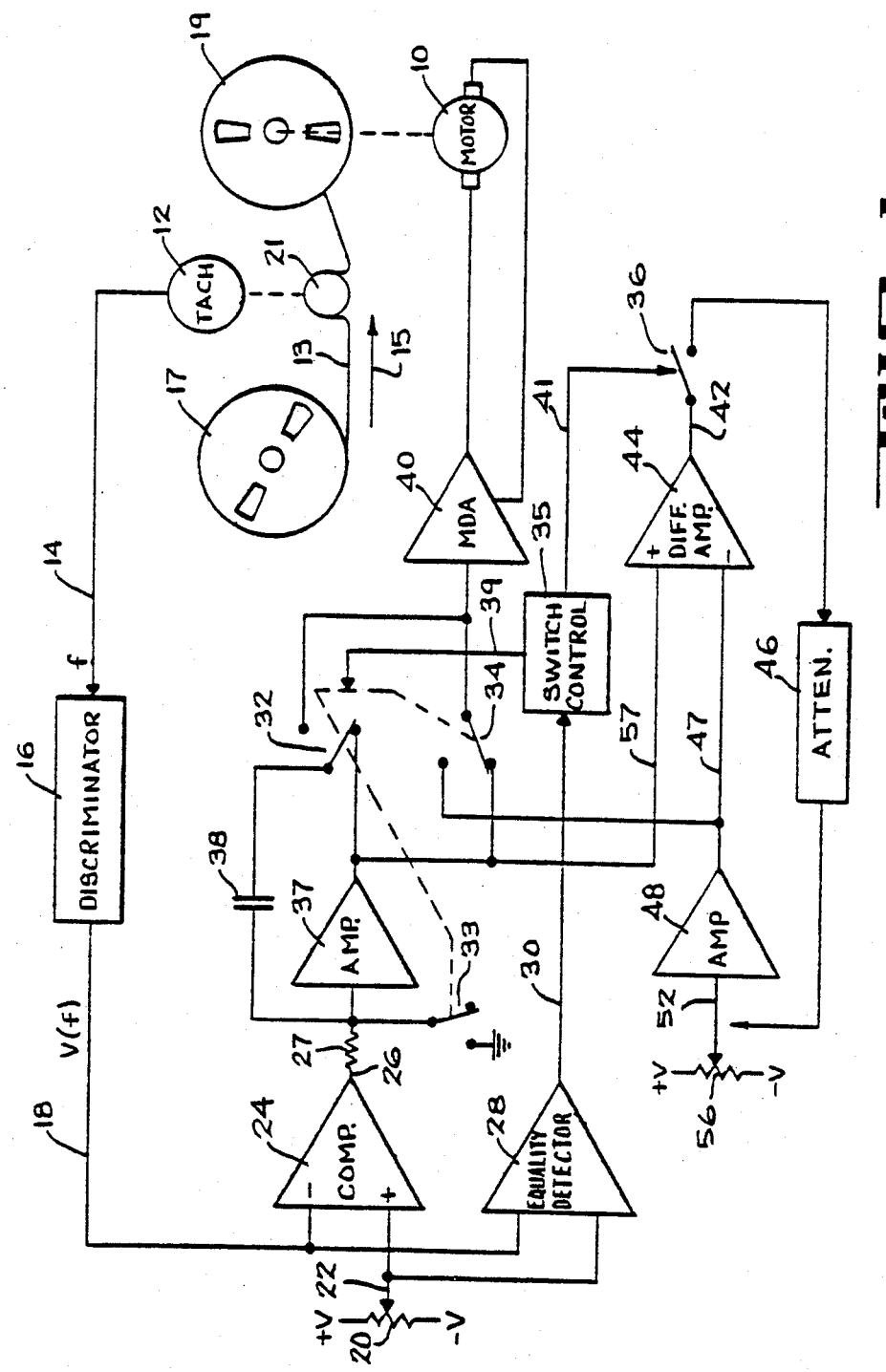
FIG. 1 is a generally schematic functional diagram of an analog implementation of a motor controller in accordance with the present invention for a video tape recorder.

Referring to FIG. 1, magnetic tape 13 in a video tape recorder is moved in direction 15 from a supply reel 17 to a take up reel 19 by a torque applied to reel 19 by motor 10. The magnetic tape, in traversing the path from the supply to the take up reel, passes around a tape idler 21 which functions to maintain continuous non-slip physical contact with the magnetic tape. Coupled to the tape idler is a tachometer 12 which functions to generate a signal having a frequency proportional to the passage of magnetic tape around the tape idler. In operation, the source of energy, represented by motor 10, would produce a linear tape velocity of magnetic tape 13 as a parameter of interest by applying an appropriate torque to take up reel 19. While not shown it is understood that an additional motor supplies a constant negative torque to supply reel 17 to maintain a constant tension on magnetic tape 13. The desired parameter of interest, i.e., the linear velocity of magnetic tape 13 is measured by tachometer 12. In response to the rotation of idler 21, tachometer 12 produces a signal 14 having a frequency proportional to the angular velocity of idler 21, and consequently proportional to the linear velocity of magnetic tape 13. Discriminator 16 produces signal 18 having a magnitude proportional to the frequency of signal 14, and consequently proportional to the linear velocity of magnetic tape 13. Level adjusting device 20 is preferably a potentiometer having its end terminals connected to potentials of opposite polarity and its moveable connector to one input of comparator 24. The signal 22 from the moveable connector functions to define a desired velocity. Comparator 24 functions to compare the measured velocity as represented by signal 18, with the desired velocity as represented by signal 22. Consequently the output 26 from comparator 24 will be in a first state when the magnitude of signal 18 is greater than the magnitude of signal 22, and will be in a second state when the magnitude of signal 18 is less than the magnitude of signal 22. Equality detector 28 functions to compare the measured velocity as represented by signal 18, with the desired velocity as indicated by signal 22, and generates an output signal 30 having a first state when the measured velocity as represented by the magnitude of signal 18 equals the desired velocity as indicated by the magnitude of signal 22, and a second state when the measured velocity as represented by signal 18 does not equal the desired velocity as indicated by the magnitude of signal 22. Signal 30 functions as a control input to switch control 35. Switch control 35 functions to produce control signals 39 and 41 which operate switches 32, 33, 34 and 36 respectively, as follows. Upon the receipt of signal 30 from equality detector 28 indicating equality between the two respective inputs thereto, after a preselected amount of delay, switch control 35 first produces a control signal 41 to close switch 36, after which control signal 41 operates to open switch 36. Thereafter switch control means 35 produces control signal 39 which operates to effect a change in position of switches 32, 33 and 34, as illustrated in FIG. 3 and more fully discussed hereinafter.

When the measured linear velocity of magnetic tape 13 does not equal the desired linear velocity, i.e., the magnitude of signal 18 does not equal the magnitude of signal 22, signal 30 from equality detector 28 is in the corresponding state such that switch control 35 produces the appropriate switch control signals 39 and 41 such that switches 32, 33, 34 and 36 are positioned as follows. Switch 32 connects capacitor 38 from the input of amplifier 37 to the output of amplifier 37, and to the input of differential amplifier 44. Switch 34 functions to connect the output from amplifier 37 to the input of motor drive amplifier 40, and switch 36 functions to disconnect the output 42 from difference amplifier 44 from the input to attenuator 46. Switch 33 removes the ground from the input of amplifier 37. In this configuration amplifier 37, resistor 27 and capacitor 38 function to form an integrator which produces an output voltage which will increase or decrease with time depending upon the polarity of the signal 26. In particular, if the measured linear velocity of magnitude tape 13 as represented by the magnitude of signal 18 is less than the desired linear velocity as represented by the magnitude of signal 22, signal 26 from comparator 24 will be a positive constant level. The corresponding signal produced by amplifier 37, resistor 27 and capacitor 38 will be a signal which increases in magnitude with time. As the output from amplifier 37 is supplied as an input to motor drive amplifier 40, this will result in a motor control signal to motor 10 likewise increasing with time. This situation is illustrated in FIG. 3 in the time interval between time $t_1$ and $t_3$. If however, the measured linear velocity of magnetic tape 13 is greater than the desired linear velocity, signal 26 from comparator 24 will be a negative constant level. The corresponding signal produced by amplifier 37, resistor 27 and capacitor 38 will be a signal which increases in a negative magnitude with time. This will result in a motor control signal to motor 10 which likewise decreases with time, and is illustrated in FIG. 3 in the time interval between time $t_5$ and t₇. The condition of the motor control signal to motor 10 either increasing or decreasing with time, depending upon the comparison between the measured linear tape velocity and the desired velocity, will continue until the measured linear velocity of magnetic tape 13 equals the desired velocity. At this point output signal 30 from equality detector 28 will indicate this equality by changing from a first state to a second state, and thereby changing the position of switch 32, 33, 34 and 36 as follows. Upon agreement between the measured linear velocity of magnetic tape 13 and the desired velocity, switch control 35 will first operate switch 36 to connect output signal 42 from difference amplifier 44 to attenuator 46. Consequently output signal 42 from difference amplifier 44 will be equal to the difference in magnitude between the present value of the output from amplifier 37 and the value from amplifier 48. Signal 42, after attenuation by attenuator 46, functions to adjust the level of signal 47 from amplifier 48 by changing the level of the input to amplifier 48 by level adjusting means 56. Consequently the value of signal 47 is related to the difference between the the value of the output from amplifier 37 and the previous value of signal 47.

Thereafter, switch control 35 means disconnects signal 42 from attenuator 46 by operation of signal 41 on switch 36, and thereafter changes the position of switches 32, 33 and 34 such that the input to amplifier 37 and the terminal of capacitor 38 connected thereto are connected to ground potential by switch 33, and the second terminal of capacitor 38 as well as the input of motor drive amplifier 40 are connected to the output of amplifier 48 through switches 32 and 34. Consequently capacitor 38 will charge to a potential equal to the output of amplifier 48, and motor drive amplifier 40 will produce a constant motor drive signal to motor 10 in accordance with the magnitude of the constant signal from amplifier 48. In this regard it should be noted that level adjusting means 56 and amplifier 48 comprise a method of storing a constant value. Likewise difference amplifier 44 functions to determine the difference between the magnitude of the peak value produced by the combination of amplifier 37 and capacitor 38 and the constant value stored by level adjusting means 56 and amplifier 48. Attenuator 46 functions to multiply the difference determined by difference amplifier 44 by a constant. This constant is application dependent as will be more fully discussed hereinafter. Consequently, level adjusting means 56, amplifier 48, difference amplifier 44 and attenuator 46 function to produce a signal which when applied to motor drive amplifier 40 will be equal to the previous constant control signal supplied to motor drive amplifier, plus the product of the difference between the previous constant control signal and the peak value of either the increasing or decreasing control signal, multiplied by a constant.

An example will serve to further illustrate the operation a motor controller incorporating the present invention.

Referring now to FIGS. 1 and 3, it will be observed from FIG. 3 that prior to time $t_1$ the measured linear velocity is constant at a desired velocity $V_1$. Consequently to corresponding motor control signal, as illustrated in FIG. 3(b), prior to time $t_1$ is constant at level $C_1$. This condition would be produced by the operation of the functional motor controller illustrated in FIG. 1 as follows. As the measured linear velocity of magnetic tape 13 indicated by the level of signal 18 produced by discriminator 16 in response to signal 14 from tachometer 12 equals the level of signal 22 produced by potentiometer 20, indicating that the measured linear velocity equals the desired velocity, the levels of signals 18 and 22 will be identical. Consequently signal 30 from equality detector 28 will assume the appropriate state indicating equality. Signal 39 from switch control 35 will operate switches 32, 33 and 34 such that one terminal of capacitor 38 and the input to amplifier 37 is connected to ground, and the remaining terminal of capacitor 38 is configured to the output of amplifier 48. The output from amplifier 48 is configured to the input of motor drive amplifier 40. Consequently capacitor 38 will charge to the magnitude of the output from amplifier 48. In addition, input signal 47 to motor drive amplifier 40 maintains a constant value determined by the level of the input signal 52 to amplifier 48. This condition will continue as long as the measured velocity equals the desired velocity $V_1$.

If the measured velocity of motor 10 does not equal the desired velocity $V_1$, a continually increasing or decreasing motor control signal will be supplied to motor 10, determined by the relationship between the measured linear velocity of magnetic tape 13 and the desired velocity, i.e., an increasing control signal to motor drive amplifier 40 will result from the measured linear velocity of tape 13 being less than the desired velocity, and a decreasing control signal to motor drive amplifier 40 will result if the measured angular velocity is greater than the desired velocity, as follows.

Referring to FIG. 1, if the measured linear velocity of magnetic tape 13 as represented by the level of signal 18 from discriminator 16 in response to signal 14 from tachometer 12, is less than the desired velocity, as represented by signal 22 from potentiometer 20, output signal 26 from comparator 24 will assume a positive potential. Consequently, a signal of constant value having a positive potential will be supplied as input 26 to amplifier 37 through resistor 27. It will be noted that as the level of signal 18 does not equal the level of signal 22, the output signal 30 from equality detector 28 will assume a state indicating said inequality between the measured linear velocity of magnetic tape 13 and the desired velocity, which results in switches 32, 33 and 34 functionally connecting capacitor 38 between the input and output terminals of amplifier 37, and connecting the output from amplifier 37 to the input to motor drive amplifier 40. Consequently the constant level of signal 26 will be integrated by the combination of capacitor 38 and amplifier 37 producing a signal having a continuously increasing level as an input to motor drive amplifier 40. This condition is illustrated in FIG. 3 as an increasing motor control signal between time $t_1$ and $t_3$.

In similar fashion, if the measured linear velocity is greater than the desired velocity $V_1$, a motor control signal having a continuously decreasing level will be supplied to motor 10, as follows.

Referring once again to FIG. 3, a measured velocity greater than the desired velocity of $V_1$ will result in the level of signal 18 being greater than the level of signal 22; consequently output signal 26 from comparator 24 will assume a constant negative potential. In a manner similar to the above, signal 30 produced by equality detector 28 operates to configure switches 32, 33 and 34 such that capacitor 38 is connected between the input and output of amplifier 37, and the output of amplifier 37 to the input to motor drive amplifier 40. Signal 26 produced by comparator 24 will be at a constant level with a polarity opposite that above discussed. Consequently the input to motor drive amplifier 40 from the combination of amplifier 37, resistor 27 and capacitor 38 will be a signal having a continuously decreasing level. This condition is illustrated in FIG. 3 for time periods subsequent to $t_5$ and prior to time $t_7$.

When the measured linear velocity of magnetic tape 13 equals the desired velocity $V_1$, signal 30 from equality detector 28 will operate switch control 35 as previously discussed.

The foregoing has disclosed a functional analog implementation of a motor control system incorporating the present invention for maintaining a linear velocity of magnetic tape equal to a desired velocity over a wide range of desired velocities and in the presence of dynamically changing loads. However, the present invention, as more fully set forth in the claims herein, would find a broad range of applications wherein a parameter of interest produced by a source of energy in response to a control signal to the source of energy was desired to be maintained equal to a defined value.

Broadly stated, the foregoing has functionally illustrated the generation of a control signal to a source of energy according to the following relations.

If a parameter of interest produced by a source of energy is less than a desired value, a control signal is supplied to the source of energy in such a manner that the parameter will correspondingly increase in value with time, i.e., $$C(t)=k_1 t$$

where C(t) is the control signal supplied to the source of energy necessary to effect an increase in the parameter of interest, and $k_1$ is an application dependent constant proportional to the slope of the correction signal.

In a similar manner, if the parameter of interest is greater than the desired value, a control signal is supplied to the source of energy such that the parameter will correspondingly decrease in value with time, i.e., $$C(t)=-k_1 t$$

where C(t) is the control signal supplied to the source of energy necessary to effect a decrease in the parameter of interest, and $k_1$ is an application dependent constant proportional to the slope of the correction signal.

It should be understood that while the foregoing illustrates a linearly changing control signal in response to a non-equality between the parameter and the desired value, the relationship could, broadly speaking, be a generally monotonically changing one.

This condition is illustrated generally in FIG. 3. In the time interval between $t_1$ and $t_3$, wherein the parameter of interest is less than the desired value, e.g., the measured linear velocity is less than the desired velocity $V_1$, the control signal to the motive force element changes in such a manner to effect a continuous increase in the parameter of interest, e.g., the motor control signal ramps up thereby resulting in the measured linear velocity increasing. In the time interval between $t_5$ and $t_7$, wherein the parameter of interest is greater than the desired value, e.g., the measured linear velocity is greater than the desired velocity $V_1$, the control signal to the source of energy changes in such a manner to effect a continual decrease in the parameter of interest, e.g., the motor control signal ramps down thereby resulting in the measured linear velocity decreasing.

When the parameter associated with the quantity of interest equals the desired value, the level of the control signal thereafter supplied to the motive force element will be a constant level defined by $$C_n=C_{n-1}+\Delta C_{m;n-1} k_2 \quad m,n=1,2,3\ldots$$

where $C_n$ is the new constant level to be applied to by control signal to the source of energy; $C_{n-1}$ is the constant level previously applied by the control signal to the source of energy during the preceeding interval when the parameter of interest equalled the desired value; $\Delta C_{m;n-1}$ is the difference between $C_m$, i.e. the maximum or minimum level of either the increasing or decreasing control signal respectively applied to the motive force element just prior to the parameter of interest becoming equal to the desired value, and $C_{n-1}$; and $k_2$ is an application dependent constant.

Referring once again to FIG. 3, when the parameter of interest equals the desired value, e.g., when the measured linear velocity equals the desired velocity $V_1$ at time $t_3$, the constant level ($C_n$) applied by the control signal to the source of energy is equal to the constant level previously applied to the source of energy during the preceeding interval when the parameter of interest equalled the desired value (i.e., $C_1$), plus the difference between $C_{n-1}$ (i.e., $C_1$), and the maximum level of the increasing control signal applied to the motive force element just prior to the parameter of interest becoming equal to the desired value (i.e., $C_5$), multiplied by the constant $k_2$. Hence in the example illustrated in FIG. 3 for time $t_3$ when the measured linear velocity becomes equal to the desired velocity $V_1$, the new constant level (e.g., $C_3$) applied to the source of energy at time $t_3$ would be $$C_3=C_1+(C_5-C_1)k_2$$

In a similar fashion, the new constant level applied by the control signal to the source of energy at time $t_7$ when the measured linear velocity equals the desired velocity is $$C_4=C_2+(C_6-C_2)k_2$$

Consequently it is broadly observed that the series of acts of repeatedly adjusting the control signal to the motive force element in accordance with the method above discussed, will result in a corresponding series of adjustments on the parameter of interest, thereby effecting agreement between the parameter and the desired value in a minimum amount of time.

Conceptually speaking, if the degree of agreement attainable in a given amount of time between the parameter of interest and the desired value is considered as the subject matter upon which the act or series of acts as heretofore set forth in generating the control signal to the source of energy in response to the non-agreement between the parameter and the desired value are performed, then it is clear that said acts or series of acts heretofore set forth are transforming and reducing said subject matter to a different state, i.e., an improved degree of agreement is obtainable in a given time period between a parameter of interest and a desired value.

While the foregoing discloses an analog functional implementation of a motor controller, digital techniques were employed in the preferred embodiment of a motor controller incorporating the present invention, as more fully disclosed below.

Figure 4:
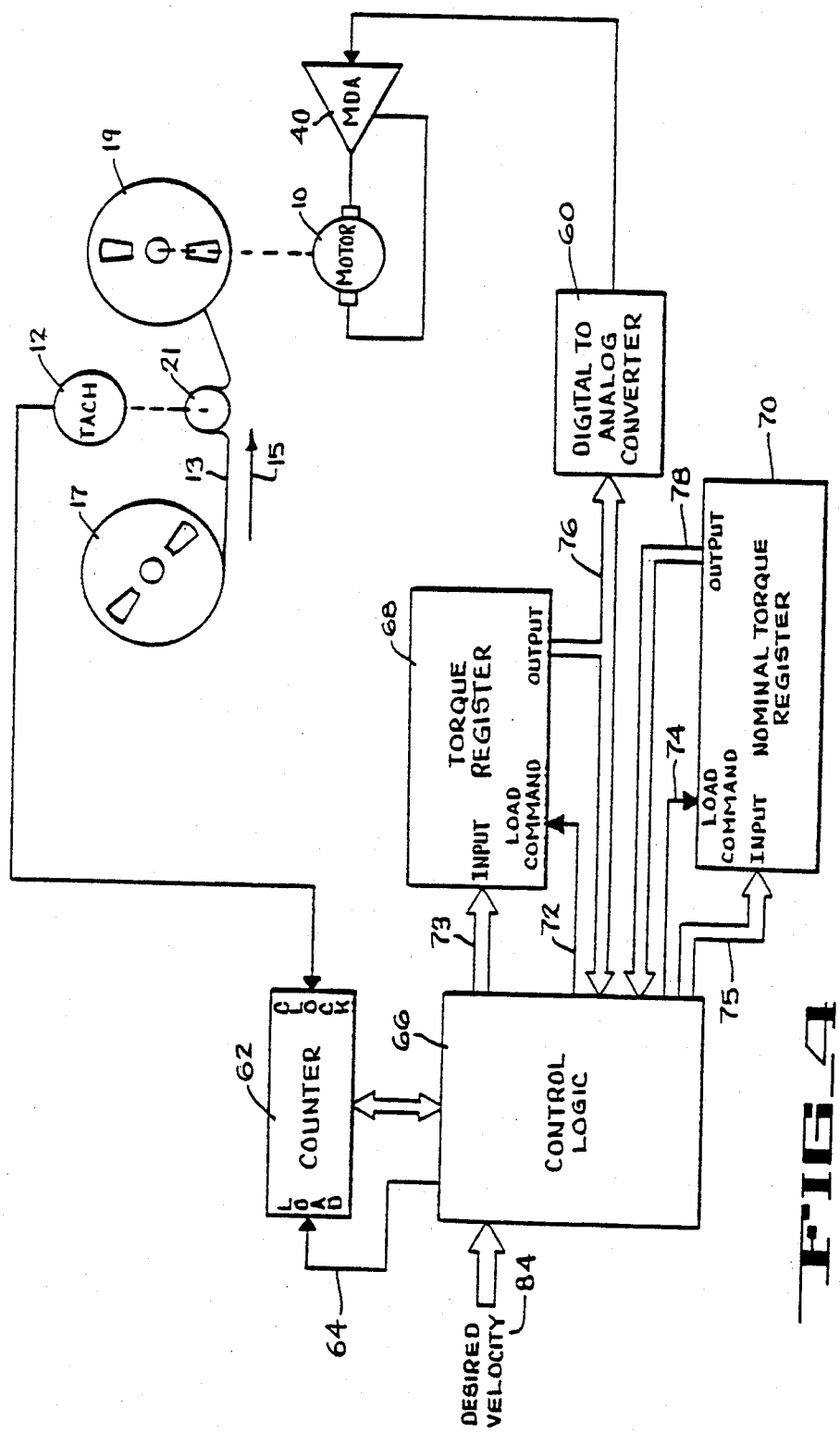
FIG. 4 is a generally schematic functional diagram of a digital implementation of a motor controller in accorcance with the present invention.

Referring now to FIG. 4 a motor control signal to motor 10 is generated by motor drive amplifier 40 in response to the analog signal produced by digital-to-analog converter 60. Tachometer 12 is operatively coupled to tape idler 21 and produces a signal 14 having a frequency proportional to the measured linear velocity of magnetic tape 13. Signal 14 from tachometer 12 is connected to a clock input of counter 62. Counter 62, in response to load signal 64, will store a digital number supplied from control logic 66. Thereafter signal 14 from tachometer 12 will change the value of said number in accordance with the linear velocity of magnetic tape 13 as measured by tachometer 12. Torque register 68 and nominal torque register 70 function in response to load command signals 72 and 74 respectively to store a digital number supplied by inputs 73 and 75 respectively from control logic 66. Torque register 68 and nominal torque register 70 each supply a digital output signal representative of the digital value stored therein as output signals 76 and 78 respectively. Output signal 76 is supplied as input to control logic 66 as well as to digital-to-analog converter 60. Output signal 78 is supplied as an input to control logic 66. Control logic 66 in response to desired velocity input 84 functions to provide the above referenced output load signals 64, 72 and 74 to counter 62, torque register 68 and nominal torque register 70 respectively. Control logic 66 likewise provides digital signals to torque register 68 and nominal torque register 70 representive of a desired value to be stored therein, and receives as inputs the corresponding outputs from torque register 68 and nominal torque register 70. Control logic 66 likewise provides an input to and receives an output from counter 62.

Torque register 68 functions to store the digital value which is supplied as an input to digital-to-analog converter 60. Consequently the digital value stored in torque register 68 will control the magnitude of the motor control signal supplied to motor drive amplifier 40 by digital-to-analog converter 60, and hence controls the measured linear velocity of magnetic tape 13.

Nominal torque register 70 functions as a storage device to store the last value which was supplied by torque register 68 as a constant value, corresponding to the situation when the measured velocity was equal to the desired velocity.

The operation of a motor speed controller as illustrated in FIG. 4 incorporating the present invention can be more fully understood with reference to FIG. 5.

Referring to FIG. 5 control logic 66 (FIG. 4) first determines the measured linear velocity of magnetic tape 13. This is accomplished in cooperation with counter 62 by determining the change in the value stored in counter 62 over a measured time interval by control logic 66. Thereafter in block 88 control logic 66 determines if the slope of the signal supplied to motor drive amplifier 40 is positive or negative. If said slope was positive, control logic 66 in block 90 determines if the measured linear velocity of magnetic tape 13 is greater than or equal to the desired velocity 84. This is done by digitally comparing the desired velocity 84 with the measured linear velocity of magnetic tape 13 determined in block 86. If the measured linear velocity of magnetic tape 13 is greater than or equal to the desired velocity, control logic 66 will next perform the operation indicated in block 97. In a similar fashion if the slope of the motor control signal supplied to motor drive amplifier 40 was not positive, control logic 66 will determine if the measured velocity of magnetic tape 13 is less than or equal to the desired velocity in block 94. This is accomplished by again comparing the desired velocity 84 with the measured velocity of magnetic tape 13 determined in conjunction with counter 62, as hereinabove discussed. If the measured velocity of magnetic tape 13 is less than or equal to the desired velocity speed, control logic 66 again performs the operation in block 97.

If the measured velocity of magnetic tape 13 is not greater than or equal to the desired velocity, as determined by block 90, indicating the presence of the situation wherein the motor controller is in the process of increasing the level of the drive signal to motor 10, control logic 66 will increment the value currently stored in torque register 68, as indicated by block 92. In a similar fashion if the measured velocity of magnetic tape 13 is not less than or equal to the desired velocity, control logic 66 will decrement the value stored in torque register 68, as indicated in block 95. Thereafter control logic 66 will delay a finite amount of time as indicated in block 96, after which control logic 66 will once again determine the measured velocity of magnetic tape 13 as indicated in block 86. Consequently it is observed that operational blocks 86, 88, 90, 92, 94, 95 and 96 in FIG. 5 operate to sequentially increment or decrement the magnitude of the motor drive signal supplied by digital-to-analog converter 60 to motor drive amplifier 40 in response to the previous slope of said motor drive signal as determined in functional block 88, to correct respectively the two situations wherein the measured velocity of magnetic tape 13 is not equal to the desired velocity, i.e., when the measured velocity of magnetic tape 13 is less than or greater than the desired velocity.

The YES condition from blocks 90 and 94 result from the corrective action applied to motor 10 by either incrementing or decrementing the value stored in last torque register 68 resulting in the measured velocity of magnetic tape 13 now being greater or less than the desired velocity 84, respectively.

Block 97 functions to determine if the value stored in torque register 68 is equal to the value stored in nominal torque register 70. If this condition is found to exist, further action by control logic 66 is not necessary and control logic 66 thereafter repeats the above described procedure by again determining the measured velocity in block 86.

However, if control logic 66 in block 97 does not find the value stored in torque register 68 to be equal to the value stored in nominal torque register 70, this indicates that a change in the digital number supplied to digital-to-analog converter 60 will be necessary from the previous value used during the preceeding period of constant velocity, as stored in nominal torque register 70.

In particular, if the value stored in last torque register 68 is not greater than the value stored in nominal torque register 70, control logic 66 will, in block 100, subtract the value stored in torque register 68 from the value stored in nominal torque register 70. Thereafter control logic 66 in block 102 will determine if the difference determined in block 100 is greater than a predefined constant. This predefined constant is a parameter depending upon the particular application of a motor controller incorporating the present invention, and determines the amount of change necessary between the two said values before a change will be effected in the digital value supplied to digital-to-analog converter 60 for constant velocity. If the difference determined in block 100 is greater than that constant, control logic 66 will thereafter perform a scaling operation on said difference as indicated at block 104. Said scaling operation is again a parameter dependent upon the application of a motor controller incorporating the present invention, and represents the amount of change said difference determined in block 100 will affect the resulting digital value supplied to digital-to-analog converter 60 to effect the desired constant velocity. Thereafter control logic 66 in block 106 will subtract said result determined in block 104 from the value present in nominal torque register 70, and thereafter, in block 116, load this value into torque register 68. Thereafter control logic 66 will repeat the above procedure by next determining the measured velocity of magnetic tape 13 as indicated in block 86.

If the value stored in torque register 68 is greater than the value stored in nominal torque register 70, control logic 66 will then subtract the value stored in nominal torque register 70 from the value stored in torque register 68, as indicated by block 108. In a similar manner as above discussed, control logic 66 will next determine if the difference determined in block 108 is greater than that constant value previously discussed. If said difference is greater than said constant, control logic 66 will in a similar fashion perform a scaling operation on said difference in block 112, and thereafter add the results to the above described calculation to the value stored in nominal torque register 70, as indicated in block 114. Thereafter control logic 66 will store the value which presently exists in nominal torque register 70 in torque register 68. Thereafter control logic 66 will again repeat the above described procedure by next determining the measured velocity of motor 10 in block 86.

Consequently from the foregoing, a digital functional implementation of a control system has been described wherein a control signal to a source of energy i.e., motor 10, continually increases in value in response to the parameter of interest, i.e., a constant linear velocity of magnetic tape 13, being less than a desired value, and likewise continually decrease in value in response to the parameter associated of interest being greater than a desired value. When the parameter of interest equals the desired value, a constant control signal is supplied to the source of energy equal to the previous constant control signal plus the difference between the previous constant control signal and the peak value achieved by the continually increasing or decreasing control signal, multiplied by a constant.

In connection with the foregoing discussion, a number of application dependent parameters have been referenced. These will now be discussed in more detail with particular reference to their purpose and considerations present in selection of values for each.

One parameter present in the inventive concept presented herein relates to the slope or rate of increase present in the control signal generated in response to the parameter of interest produced by the source of energy not being equal to the desired value. The slope herein referenced is illustrated in FIG. 3 as the slope of motor control signal during the time intervals $t_1$ to $t_3$ and $t_5$ to $t_7$. The slope herein referenced will determine the amount of time required for the parameter of interest produced by the source of energy to adjust to the desired value in response to the control signal to the source of energy. In the functional analog implementation illustrated in FIG. 1, this slope would be determined by the magnitude of the constant levels produced by comparator 24, and the value of capacitor 38 and the value of resistor 27. In the preferred embodiment this slope would be determined by the amount of delay introduced in block 96 of FIG. 5. In the preferred embodiment this delay was seven milliseconds.

An additional parameter present in the inventive concept presented herein relates to a practical limit on the smallest value allowed for $\Delta C_{m;n-1}$. In particular, as $\Delta C_{m;n-1}$ determines in part the constant level of the control signal to be supplied to the source of energy when the parameter of interest produced by the source of energy equals the desired value, clearly as the value of the parameter becomes progressively closer to the desired value a point will be reached wherein the value of the parameter may be considered to be equal to the desired value. This is necessary to prevent continual changes is $C_n$. In the preferred embodiment, this limitation was set at two bits of the eight bits which comprise the relevant binary word.

An additional parameter present in the inventive concept presented herein relates to the value of the constant k. The constant k generally relates to a gain factor associated with the constant level supplied as a control signal to the source of energy in response to the parameter of interest produced by the source of energy equalling the desired value. The value of k, broadly speaking, will control the rate at which successive adjustments to the constant level supplied to the source of energy approach the correct constant level for the control signal. If the value chosen for k is too small, an excessive amount of time will be required for the adjustment of the parameter to the desired value. However, if the value chosen for k is excessive, undesirable oscillations will result. In the preferred embodiment herein, empirical evidence suggests that the value for k must be less than 0.5. In the preferred embodiment a value of 0.125 was found to produce satisfactory results.

The final parameter present in the inventive concept presented herein relates to the intial value chosen for the prior constant level (i.e., $C_{n-1}$) upon the first occurrence of the parameter of interest becoming equal to the desired value. Again, experience has indicated that this value is not critical, and can in fact be zero, as subsequent iterations in the process will quickly correct any error. However, in the preferred embodiment employed on a video tape recorder, the initial value is chosen based upon the amount of magnetic tape present on the take up reel. This is significant in this particular application due to the situation which is present in changing from the PLAY mode of operation wherein the linear velocity of the magnetic tape is controlled by the capstan and pinch roller arrangement previously discussed, to the SHUTTLE mode of operation, wherein the linear velocity of the magnetic tape is controlled directly by the torque supplied to the take up reel. In particular it is desirable to maintain a relatively constant tension on the magnetic tape in the transition between the PLAY and SHUTTLE mode. Consequently the initial value chosen for the constant $C_{n-1}$ is chosen such that $C_{n-1}$ is proportional to the amount of magnetic tape present on the take up reel. In the application at the preferred embodiment employed on a video tape recorder, the value of this constant is determined by counting the number of pulses produced by the tachometer attached to the tape idler which occur for a 1/16 revolution of the take-up reel.

While the foregoing has discussed the application of a motor controller incorporating the present invention to a particular linear velocity control system, it is readily apparent to one with ordinary skill in the art that the inventive concept herein can be applied to a wide range of applications. A few of such applications include the examples relating to the disk attached to the shaft of the electric motor, the environmental control system wherein temperature or pressure are desired to be controlled, the automatic automotive speed control system, and the electrical switching power supply. These illustrations are given by way of examples of the broad range of applications to which the inventive concept herein would apply. Consequently the particular application discussed herein is not to be interpreted in a limiting way; rather the inventive concept herein is to be limited only by the following claims.

What is claimed is:

1. A method of operating a control system for controlling the value of a parameter produced by a source of energy responsive to a value of a control signal and a desired gain for maintaining a desired value of the parameter, said method comprising the steps of:
    measuring the value of the parameter;
    comparing the value of the parameter with the desired value; and
    adjusting the control signal to effect a change in the parameter toward the desired value when the value of the parameter does not equal the desired value, and setting the control signal equal to a constant value $C_n$ when the value of the parameter is equal to the desired value according to the relation
    $$C_n = C_{n-1} + (\Delta C_{m;n-1})(k) \quad m,n = 1,2,3,\ldots$$
    where $C_{n-1}$ is the value of $C_n$ during the preceeding occurrence of the parameter being equal to the desired value, $\Delta C_{m;n-1}$ is the difference between the value of the adjusted control signal when the parameter was equal to the desired value and $C_{n-1}$, and k is a constant.

2. A method of operating a control system as recited in claim 1 wherein the step of adjusting the control signal further comprises:
    monotonically adjusting the control signal to effect a monotonic change in the parameter toward the desired value when the value of the parameter does not equal the desired value.

3. A method of operating a control system as recited in claim 1 wherein the value of the numeric constant k is less than 1.0.

4. Apparatus for controlling the value of a parameter produced by a source of energy responsive to a value of a control signal and a desired gain for maintaining a desired value of the parameter, comprising:
    measuring means for measuring the value of the parameter;
    comparing means for comparing the value of the parameter with the desired value; and
    adjusting means for adjusting the control signal to effect a change in the parameter toward the desired value when the value of the parameter does not equal the desired value, and setting the control signal equal to a constant value $C_n$ when the value of the parameter is equal to the desired value according to the relation
    $$C_n = C_{n-1} + (\Delta C_{m;n-1})(k) \quad m,n = 1,2,3,\ldots$$
    where $C_{n-1}$ is the value of $C_n$ during the preceeding occurrence of the parameter being equal to the desired value, $\Delta C_{m;n-1}$ is the difference between the value of the adjusted control signal when the parameter was equal to the desired value and $C_{n-1}$, and k is a constant.

5. Apparatus for controlling the value of a parameter produced by a source of energy as recited in claim 4, wherein the adjusting means further comprises:
    means for monotonically adjusting the control signal to effect a monotonic change in the parameter toward the desired value when the value of the parameter does not equal the desired value.

6. Apparatus for maintaining a linear velocity of a web material at a desired linear velocity as the web material is spooled from a first reel to a second reel driven by a torque producing means and responsive to a desired gain comprising:
    measuring means for repetitively measuring the linear velocity of the web material at frequent intervals;
    comparing means for comparing the measured linear velocity with the desired linear velocity at said frequent intervals; and
    control means responsive to said comparing means for continuously increasing the torque on the second reel when the measured linear velocity is less than the desired linear velocity, and continuously decreasing the torque on the second reel when the measured linear velocity is greater than the desired linear velocity, and maintaining a constant torque $C_n$ on the second reel when the measured linear velocity is equal to the desired linear velocity according to the relation
    $$C_n = C_{n-1} + (\Delta C_{m;n-1})(k) \quad m,n = 1,2,3,\ldots$$
    where $C_{n-1}$ is the previous value of $C_n$ during the preceeding occurrence of the measured linear velocity being equal to the desired linear velocity, $\Delta C_{m;n-1}$ is the difference between the value of the changing torque when the measured linear velocity was equal to the desired linear velocity and $C_{n-1}$, and k is a constant.

7. Apparatus as recited in claim 5 wherein the value for the numeric constant k is less than 1.0.

8. Apparatus as recited in claim 6 wherein the value for the numeric constant k is less than 1.0.

9. A device for producing a drive signal to a motor responsive to a measured velocity of apparatus controlled by a motor and a refernece velocity comprising:
    ramp generation means for generating a continually increasing drive signal in response to the measured velocity of the apparatus being less than the reference velocity, and for generating a continually decreasing drive signal in response to the measured velocity of the apparatus being greater than the reference velocity;
    constant drive signal generation means for producing a constant drive signal and for periodically adjusting said drive signal by an amount that is (a) proportional to the difference between the maximum value of the continually increasing drive signal and the constant drive signal when the measured velocity of the apparatus is less than the reference velocity and that is (b) proportional to the difference between the minimum value of the continually decreasing drive signal and the constant drive signal when the measured velocity of the apparatus is less than the reference velocity; and
    control means for supplying the increasing drive signal to the motor in response to the measured velocity of the apparatus being less than the reference velocity, for supplying the decreasing drive signal to the motor in response to the measured velocity of the apparatus being greater than the reference velocity, and for supplying the constant drive signal to the motor in response to the measured velocity of the apparatus being equal to the reference velocity.

10. A device responsive to a reference velocity and to measured velocity of apparatus controlled by a motor to produce a signal to control the motor, comprising:

comparator means responsive to the measured velocity of the apparatus and the reference velocity for producing a first signal when the measured velocity of the apparatus is less than the reference velocity and producing a second signal when the measured velocity of the apparatus is equal to the reference velocity and a third signal when the measured velocity of the apparatus is greater than the reference velocity;

ramp generation means responsive to the first and third signals for producing a fourth signal having a parameter that increases in value in response to the first signal and decreases in value in response to the third signal;

constant signal generating means responsive to the fourth signal for producing a fifth signal having a parameter proportional to the maximum value of the fourth signal in response to the measured velocity of the apparatus less than the reference velocity and the prior constant value, and proportional to the minimum value of the fourth signal in response to the measured velocity of the apparatus greater than the reference velocity and the prior constant value; and control means responsive to the second signal for producing the signal to control the motor responsive to the fourth signal when the measured velocity is not equal to the reference velocity and responsive to the fifth signal when the measured velocity is equal to the reference velocity.

11. A device responsive to a reference velocity and to a measured velocity of apparatus controlled by a motor for producing a control signal to the motor, comprising:

a first means for producing a first control signal having a parameter which continuously increases in value in response to the measured velocity of the apparatus being less than the reference velocity, and continuously decreases in value in response to the measured velocity of the apparatus being greater than the reference velocity;

a second means for producing a second control signal having a parameter proportional to the first control signal; and control means for generating the control signal to the motor proportional to the first control signal when the measured velocity of the apparatus is not equal to the reference velocity, and proportional to the second control signal when the measured velocity of the apparatus is equal to the reference velocity.

12. A device as recited in claim 11, wherein said second means further comprises:

means for adjusting the second control signal in accordance with the maximum value of the parameter of the first signal in response to the measured velocity of the apparatus being less than the reference velocity, and in accordance with the minimum value of the parameter of the first signal in response to the measured velocity of the apparatus being greater than the reference velocity.

13. A method responsive to a reference velocity and a measured velocity of apparatus controlled by a motor for producing a motor control signal, comprising the steps of:

producing a first signal having a parameter associated therewith which continuously increases in value in response to the measured velocity of the apparatus being less than the desired velocity, and continuously decreases in value in response to the measured velocity of the apparatus being greater than the reference velocity;

producing a second signal having a parameter associated therewith which is constant in a value proportional to the first signal; and producing the control signal equal to the first signal when the measured velocity of the motor is not equal to the reference velocity, and equal to the second signal when the measured velocity is equal to the reference velocity.

14. A method as recited in claim 13 wherein the step of producing the control signal further comprises the step of:

adjusting the second control signal by a parameter proportional to the maximum value of the parameter of the first signal in response to the measured velocity of the apparatus being less than the reference velocity, and adjusting the second control signal by a parameter proportional to the minimum value of the parameter of the first signal in response to the measured velocity of the apparatus being greater than the reference velocity.

* * * * *